F. A. DILLINGHAM.
WIND SHIELD.
APPLICATION FILED JUNE 9, 1916.
1,236,550.
Patented Aug. 14, 1917.
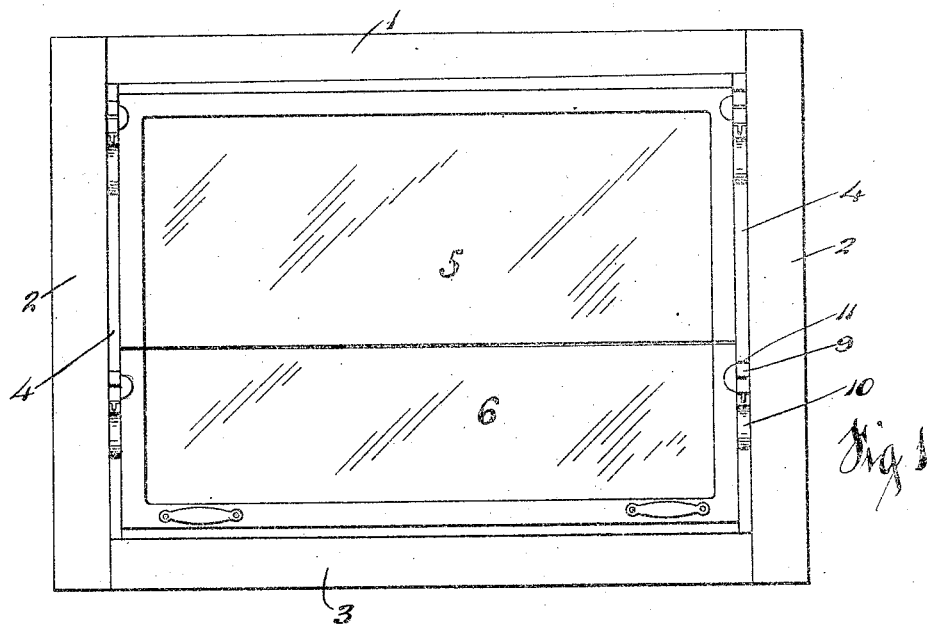
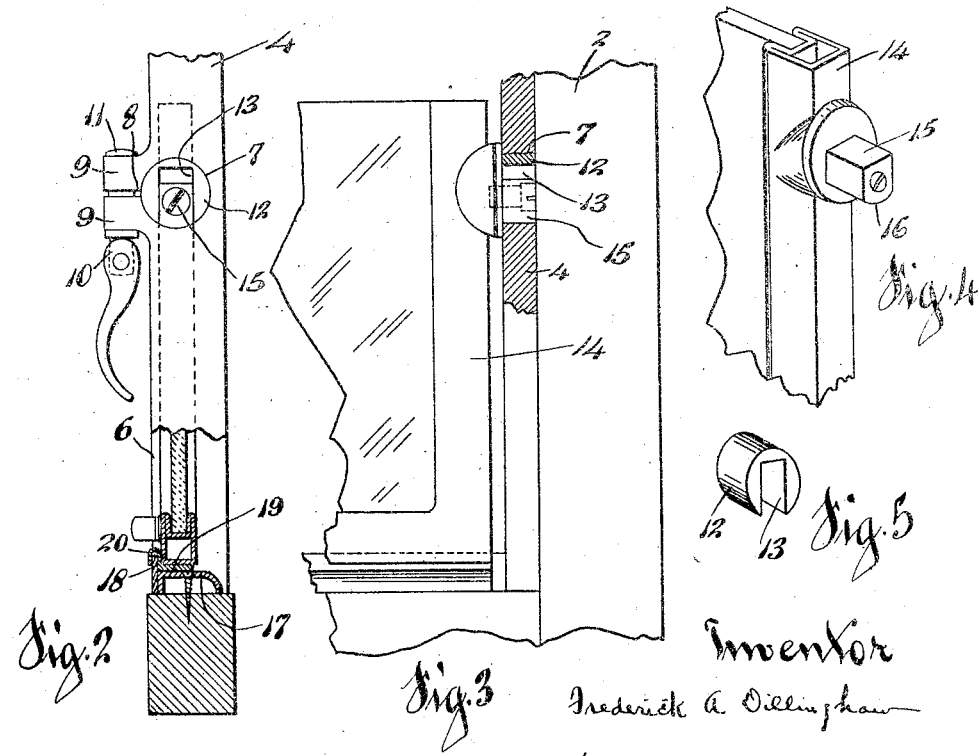
Inventor
Frederick A. Dillingham
by Allen & Allen
Attorneys

UNITED STATES PATENT OFFICE.

FREDERICK A. DILLINGHAM, OF TROY, OHIO, ASSIGNOR TO THE TROY CARRIAGE SUN SHADE COMPANY, OF TROY, OHIO, A CORPORATION OF OHIO.

WIND-SHIELD.

1,236,550.  Specification of Letters Patent.  Patented Aug. 14, 1917.

Application filed June 9, 1916. Serial No. 102,615.

*To all whom it may concern:*

Be it known that I, FREDERICK A. DILLINGHAM, a citizen of the United States, and a resident of the city of Troy, in the county of Miami and State of Ohio, have invented certain new and useful Improvements in Wind-Shields, of which the following is a full, clear, and exact description, reference being had to the accompanying drawing, forming part of this specification.

My invention relates to wind shields particularly for use with motor vehicles. In the special adaptation of my invention shown and described herein, the shield is employed in a closed car, but it will be understood that the use thereof is not limited to cars having closed bodies, and not limited to use with motor vehicles alone.

It has been found very advantageous with the lower section of a wind shield, or with the lower edge of the shield if it be a one piece shield, to have an interlocking flange construction between the shield and the frame at the lower edge of the shield where it abuts against the vehicle body. Without some such device, rain and snow will drive into the vehicle beneath the shield and fall directly on the driver of the car.

In the past it has been the custom to provide a strip of rubber either on the lower edge of the shield or on the abutting edge of the vehicle body, which serves as a weather strip but not only does this strip make the fit of the lower shield very tight, but it is subject to the defects of rubber in that it tends to become hard and to shrink. The effort has therefore been made to provide for interlocking metallic flanges as above stated, and to give the shield an upward sliding movement so that it can be lifted up enough to seat the flange at its base over the interlocking flange on the vehicle body.

To provide for this lifting motion has resulted in the past in limitation of the pivotal adjustability of the shield and it is the object of my invention to provide for such lifting motion in a shield and at the same time to make the shield fully and completely adjustable pivotally so as to take any desired position for ventilation or rain view. It is my object to provide fixed pivot centers and for an additional movement of the shield on these centers.

It is also my object to provide in this connection a locking means to clamp the shield tightly against pivotal or vertical play, so that while both motions of the shield are readily accomplished, still there will be no rattle in the shield and no excessive wear of its mounting means due to the rubbing of metallic parts against each other.

In the special adaptation of the invention, it is further my object to provide for the use with the two-motion mounting of a shield in side shield standards in which the journals for the shield are integral with the standards.

These various objects I accomplish by that certain construction and arrangement of parts to be hereinafter more specifically pointed out and claimed.

In the drawing,

Figure 1 is a front elevation of the shield mounted in a frame therefor in a closed car, the said elevation being taken from the inside.

Fig. 2 is a side elevation of the shield removed from the vehicle, partly broken away to show the interlocking devices.

Fig. 3 is a detail front elevation, partly broken away at the pivotal mounting, of the lower shield member taken from the inside of a vehicle.

Fig. 4 is a detail perspective of the mounting stud on the lower shield frame member.

Fig. 5 is a perspective view of the slotted pivotal member.

1 is the top, 2, 2, the sides and 3 the base of a framework formed at the front of a closed automobile, said frame being adapted to receive the wind shield. 4, 4, are side standards of a size to fit the said frame, said side standards adapted to be screwed to the inside edges of the frame.

There are shown two wind shield sections 5 and 6, of which 6 is the lower section to which my invention is applied. The side standards are provided with circular holes 7, and are split at 8 adjacent these holes, so as to form expandible sleeves or collars for the shield journals. Bosses 9, 9 extend out from each side of the splits 8 and cam-ended fingers 10 are provided pivotally mounted on the ends of bolts 11 which extend through the bosses. These fingers therefore serve to contract the collars, for clamping the shield in various desired positions as will be pointed out below.

I will not describe the mounting for the upper shield section, as it forms no part of this invention, said mounting and the integral side standards and pivots forming the basis of my patent application Serial No. 59,899, filed November 6, 1915.

Set into the holes 7 for the lower shield section, are cylindrical pieces 12, which are of a size to snugly fit the holes and revolve therein. These pivot pieces are slotted at 13 and set into the holes in this instance with the open ends of the slots down.

The wind shield sections have frame pieces 14 which engage over the glass of the sections, and screwed to the frame are the studs 15 which are of a size to slidably but snugly fit the slots in the cylindrical pivot pieces. These studs have rounded lower edges 16 which rest against the side of the holes 7, so that the pivot pieces are revoluble in their mounting carrying the shield with them, and the shield is slidably mounted in the pivot pieces.

The clamping fingers which close the split integral sleeve devices also force together the slotted pivot pieces, thereby serving to clamp the shield section against sliding in the slotted pieces. There is therefore no play or rattle to the shield in the pivot pieces, and no play or rattle of the pivot pieces in the sleeve devices of the side standards.

The interlocking flange or the "fence", as it is called, comprises in the present specific adaptation a metallic strip 17 fixed to the base 3 of the frame for receiving the wind shield, said strip having an upwardly extending flange 18. The shield section has a strip 19 thereon which has a return bend 20 at its inner side, which is adapted to seat over the flange 18.

For setting the wind shield section in weather-tight position, the clamps are loosened, and the section lifted upwardly and swung to a position where the return bend will seat over the upwardly extending flange. The section is then allowed to drop and the clamps are reset. The shield is then tightly locked against any movement, and a weather-tight metallic joint is formed to keep rain or snow from driving underneath it.

For adjusting the shield to any desired ventilating position, the clamps are loosened and the shield section swung in the usual manner to the exact position desired. If the shield section should also be lifted, it can be allowed to drop to its lower position, and the tightening of the clamps will again hold the shield against any rattle or free movement of any kind.

I do not wish to be limited in the claims that follow to the exact structure described in the foregoing specification, as the description refers but to the preferred form of my invention. On the contrary, I wish to be entitled to the full scope of the doctrine of equivalents in the construction of my claims. Also I do not wish to be limited in my claims because of my failure at this time to appreciate the full usefulness of my invention, as I intend it to be used in the future in any manner that may turn out to be economical and convenient, and that mere mechanical changes necessary to adapt it to future uses be fully included in the scope of my invention.

Having thus described my invention, what I claim as new and desire to secure by Letters Patent, is:—

1. In a wind shield, a shield and a member in which it is mounted, interlocking devices between the shield and the member, to make a weather-tight joint between them, slotted members, means for pivotally mounting said members, and means on the shield to engage in said slotted members, and means for clamping the mounting means over the slotted members, thereby clamping also the slotted members over the means on the shield engaging therein.

2. In a wind shield, a frame for receiving the same, interlocking flanges between the shield and the frame, split sleeves, pivot pieces revolubly mounted in the sleeves, means for clamping the sleeves over said pivot pieces, slots in the pivot pieces, and studs on the shield to engage the slots, whereby the shield may be swung on the sleeves, and lifted in the slots, and locked in fixed position, for the purpose described.

3. In a wind shield, the combination with side standards and a base weather abutment member, means for mounting the shield in the side standards so as to swing into any desired position, means for locking the shield in any such position, and means for permitting a lifting movement to said shield, said means being adapted to prevent all lifting movements except such as will enable the shield to just clear the said base weather abutment, whereby the shield can be left normally in its lower position and lifted up over the abutment and then allowed to drop back into said lower position.

4. In a wind shield, the combination with side supports and a base abutment, fixed rotary pivot members on the side supports, fixed stud members on the shield, said pivot members adapted to slidably and nonrotatably receive the stud members, whereby the shield may be swung on the pivots and raised to clear the abutment.

5. In a wind shield, the combination with a standard member and a shield member, with rotatable socket pieces on one member and studs on the other member, adapted to engage the socket pieces and slide therein and means for holding the studs against rotation in the socket pieces, for the purposes described.

6. In a wind shield, the combination with a standard member and a shield member, with rotatable socket pieces on one member and studs on the other member, adapted to engage the socket pieces and slide therein, and means for contracting the socket pieces to lock the shield member in any desired position in the standards.

7. A trunnion device for wind shields, comprising a contractible collar, a contractible sleeve rotatable therein, a stud member slidable in the sleeve, and means for contracting the said collar, for the purpose described.

FREDERICK A. DILLINGHAM.